US012754000B2

(12) United States Patent
Eriksson

(10) Patent No.: US 12,754,000 B2
(45) Date of Patent: Oct. 6, 2026

(54) PROJECTILE WITH ANTENNA

(71) Applicant: BAE SYSTEMS BOFORS AB, Karlskoga (SE)

(72) Inventor: Frans Eriksson, Hammarö (SE)

(73) Assignee: BAE SYSTEMS BOFORS AB, Karlskoga (SE)

( * ) Notice: Subject to any disclaimer, the term of this patent is extended or adjusted under 35 U.S.C. 154(b) by 0 days.

(21) Appl. No.: 18/714,174

(22) PCT Filed: Dec. 4, 2022

(86) PCT No.: PCT/SE2022/051139
§ 371 (c)(1),
(2) Date: May 29, 2024

(87) PCT Pub. No.: WO2023/113675
PCT Pub. Date: Jun. 22, 2023

(65) Prior Publication Data

US 2025/0020440 A1 Jan. 16, 2025

(30) Foreign Application Priority Data

Dec. 14, 2021 (SE) .................................... 2100185-4

(51) Int. Cl.
*F41G 7/00* (2006.01)
*F42B 12/36* (2006.01)
(Continued)

(52) U.S. Cl.
CPC .......... *F42B 30/006* (2013.01); *F42B 12/365* (2013.01); *F42B 30/003* (2013.01);
(Continued)

(58) Field of Classification Search
None
See application file for complete search history.

(56) References Cited

U.S. PATENT DOCUMENTS 2,993,443 A * 7/1961 Robinson, Jr. ........... H01Q 1/30
102/214
3,116,691 A * 1/1964 Tatel ....................... F42C 13/04
343/702
(Continued)

FOREIGN PATENT DOCUMENTS

CN 113405404 A * 9/2021 ............... F41G 3/00
RU 2233421 C2 7/2004
(Continued)

OTHER PUBLICATIONS

International Search Rerport (Feb. 20, 2023) for corresponding International App. PCT/SE2022/051139.

*Primary Examiner* — Derrick R Morgan
(74) *Attorney, Agent, or Firm* — Husch Blackwell LLP

(57) ABSTRACT

A projectile is arranged with antenna, where the projectile is intended for launch in a launch device with a propellant charge in a barrel, where the projectile is arranged with an antenna in the rear edge of the projectile, and where the antenna is arranged behind any of or a combination of: i. a protective cap which protects the antenna during the ejection phase in the barrel and which is removed when the projectile has left the barrel; and ii. a protection in the form of a molding compound arranged to protect the antenna.

8 Claims, 4 Drawing Sheets

(51) Int. Cl.
*F42B 30/00* (2006.01)
*H01Q 1/30* (2006.01)
*H01Q 19/00* (2006.01)
*H01Q 19/10* (2006.01)

(52) U.S. Cl.
CPC ............. *H01Q 1/30* (2013.01); *H01Q 19/005* (2013.01); *H01Q 19/106* (2013.01)

(56) References Cited

U.S. PATENT DOCUMENTS 3,431,815 A * 3/1969 Kaufmann, Jr. ........ F42B 14/08 102/524
3,641,936 A 2/1972 Barnett
3,722,417 A * 3/1973 Robinson, Jr. .......... F42C 13/04 102/214
3,747,530 A * 7/1973 Tepper .................... F42C 19/04 102/213
3,758,052 A * 9/1973 McAlexander ....... F42C 13/047 244/3.22
3,860,199 A * 1/1975 Dunne .................. F42B 10/661 244/3.13
4,347,996 A * 9/1982 Grosso .................. F42B 10/661 244/3.22
4,515,082 A * 5/1985 Pizzurro ................. F42B 14/06 102/501
4,641,801 A * 2/1987 Lynch, Jr. ............. F42B 10/661 244/3.22
4,867,034 A * 9/1989 Trosky .................. F42B 12/382 102/513
4,951,901 A * 8/1990 Dunne .................. F42B 10/661 244/3.22
5,039,029 A * 8/1991 Taylor ..................... G01S 11/02 244/3.21
5,192,827 A * 3/1993 Jasper, Jr. ................ G01S 7/38 102/501
5,259,567 A * 11/1993 Jano ........................ F41G 7/305 244/3.11
5,280,751 A * 1/1994 Muirhead .............. H04B 1/034 102/293
5,348,249 A * 9/1994 Gallivan ................. F41G 7/266 244/3.11
5,381,445 A * 1/1995 Hershey ................ G01S 5/0009 73/167
6,016,990 A * 1/2000 Small ...................... F41G 7/305 244/3.11
6,378,437 B1 * 4/2002 Burke, Jr. ............... F42B 15/01 73/167
6,450,442 B1 * 9/2002 Schneider ............... F41G 7/305 244/3.14
7,023,380 B2 * 4/2006 Schneider ............. G01S 5/0247 342/442
7,121,502 B2 * 10/2006 Krikorian ............... F41G 7/308 701/1
7,581,501 B1 * 9/2009 Boone ................... F42B 12/365 102/501
8,558,151 B2 * 10/2013 Seidensticker ......... F41G 7/266 244/3.13
9,638,501 B2 * 5/2017 Parker ................... F42B 12/365
9,739,585 B2 * 8/2017 Nugent, Jr. ........... F42B 12/387
10,495,429 B2 * 12/2019 Omonira ................. F42B 12/54
10,746,515 B1 * 8/2020 Parker ................... F42B 12/382
11,175,118 B1 * 11/2021 Manley ................... F42B 12/62
11,644,289 B2 * 5/2023 Parker ................... F42B 12/365 102/513
2010/0229752 A1 9/2010 Paesch et al.
2012/0199690 A1 * 8/2012 Rastegar ................. F42B 15/01 342/362
2016/0273880 A1 * 9/2016 Dryer ...................... F42C 13/04
2021/0285748 A1 9/2021 Koontz et al.
2023/0095694 A1 * 3/2023 Parker ..................... F42B 12/34 102/513

FOREIGN PATENT DOCUMENTS

WO 9855821 A1 12/1998
WO WO-0167029 A2 * 9/2001 .............. F42B 12/50
WO 2013130518 A1 9/2013

* cited by examiner

PROJECTILE WITH ANTENNA

SUMMARY OF THE INVENTION

The present invention relates to a projectile arranged with an antenna, where the projectile is intended to be launched in a launching device with a propellant charge in a barrel, where the projectile is arranged with an antenna in the rear edge of the projectile, where the antenna is arranged behind a protective cap or molding compound that protects the antenna during the ejection phase in the barrel and which is removed when the projectile has left the barrel.

Projectiles arranged in a manner allowing them to impact a target object can make use of different systems or technical solutions to improve their ability to be able to impact the target. For example, the projectile can be equipped with different sensors to detect the target object and make use of shrapnel to achieve a larger area of effect. Furthermore, the projectile can be arranged with various means to guide the projectile, such as fins, which may allow the projectile to steer towards the target object. To improve the ability of the projectile, or subsequent projectiles, to act on the target, the projectile may be equipped with a radio receiver and/or a radio transmitter, which means that the projectile is outfitted with an antenna.

By communicating information related to target objects to and from the projectile, the projectile, or subsequent or preceding projectiles, can improve their ability to impact the target.

Patent document U.S. Pat. No. 2,993,443 describes a projectile arranged with a wire antenna in the aft part of the projectile. This antenna is intended to improve the proximity fuze functionality. The patent document does not show an antenna arranged for purposes of communication, nor does the patent document show that the projectile is arranged with a protective cap arranged in the aft part of the projectile.

It is desirable to solve the problems identified above.

According to an aspect of the present invention a projectile is arranged with an antenna, where the projectile is intended for being launched in a launching device with a propellant charge in a barrel where the projectile is arranged with an antenna in the rear edge of the projectile where the antenna is arranged behind any of or a combination of:

i. a protective cap that protects the antenna during the ejection phase in the barrel and which is removed when the projectile has left the barrel, ii. a cap in the form of a molding compound arranged to protect the antenna.

that the antenna is one of the following:

i. patch antenna ii. corner reflector antenna that the antenna is of the corner reflector antenna type arranged with a dipole.

that the antenna is of the patch antenna type, whereas the patch antenna is arranged on the surface of a radar reflector. The radar reflector being, for example, a corner reflector adapted to a certain radar frequency.

that the antenna is of patch antenna type and arranged on a recessed part, where the distance H, meaning how far the recessed part is recessed relative to the rear edge, is between 1 mm and 20 mm.

that the distance D, which is the thickness of the shield, is between 2 mm and 10 mm.

that the protective cap is designed as a circular plate with the same diameter as the projectile and with a thickness in the range of 0.1 mm-30 mm.

that the protective cap is designed as a cup that partially encloses the projectile.

that the protective cap is designed as a cup that partially encloses the projectile where the projectile is arranged with a part where the cup is arranged to the projectile, with an extension in the axial joint of the projectile, dimension A, in the range of 5 mm to 25 mm.

that a corner reflector is arranged in the rear edge of the projectile.

BRIEF DESCRIPTION OF THE DRAWINGS

The invention will be described below by reference to the figures that are included there.

DETAILED DESCRIPTION

Figure 1:
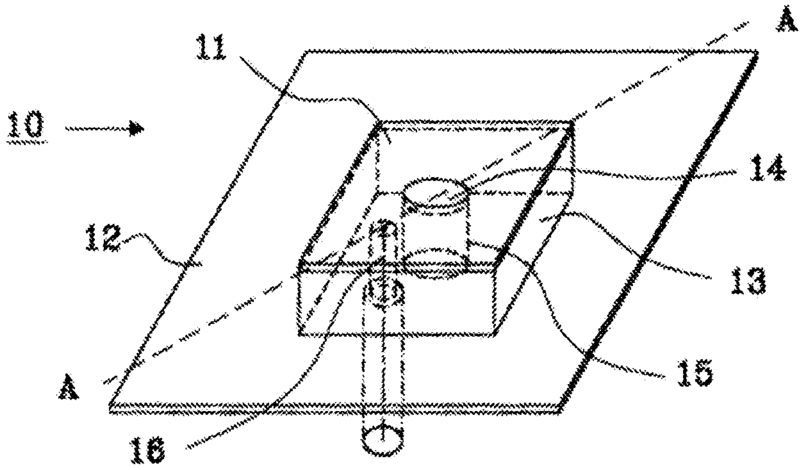
FIG. 1 shows an antenna of patch antenna type.

The present invention shows a new and alternative design of a projectile, also termed a grenade, outfitted with an antenna. An ejection device, also termed a cannon, a howitzer, or a piece, in the sense of an artillery piece, has the goal of making use a propellant for the purpose of firing a projectile. Preferably, a propellant, such as gunpowder, is initiated in one part of the cannon, oftentimes a chamber specifically adapted to the purpose. Initiation takes place by way of igniting the barrel, for instance by means of an ignition cartridge or an igniter in a munitions device, which is initiated by means of striking. Other methods for igniting the propellant may include ignition of the propellant by means of laser energy or electric energy. The propellant burns at a high rate and results in large amounts of gas being produced, which creates a gas pressure in the chamber which propels the projectile out of the barrel of the firing device. The propellant has been adapted to generate a constant pressure on the projectile during the entire barrel procedure, to the greatest extent possible, as the projectile moves in the barrel, which results in the projectile leaving the mouth of the barrel with high speed.

Projectiles, such as various types of grenades, generally include some form of operational part and some form of barrel which initiates the operational part. Fuzes can be of different types where contact fuzes are common for projectiles that are meant to burst when in contact with an object, timed fuzes when the projectile is meant to burst at a certain predetermined time and proximity fuzes when the projectile is meant to burst when an object comes within a certain distance from the projectile. The use of zone fuzes is preferred when confronting flying vessels, while timed fuzes can be used when confronting a large number of various objects. It is advantageous to combine various types of fuze functions in one and the same fuze, for instance in order for the projectile to burst after a certain time if it fails to detect any object, and so on.

It is advantageous for the operational part to comprise some type of explosive substance, as well as some type of shattering casing which encloses the explosive substance. Various types of propellants, such as fins, can furthermore be arranged in either the barrel or in their own subcomponent.

In order to stabilize the projectiles once the projectiles have left the barrel, the projectiles are preferably designed with rotation or with fins. In cases where the projectiles are designed with rotation, the projectiles are said to be rotationally stabilized and in cases where the projectiles are arranged with fins, the projectiles are said to be fin-stabilized. Fin-stabilized projectiles should have no rotation, or very low rotation, when leaving the barrel.

To achieve rotation on the projectiles, the barrel is often designed with rifling, to which the projectile connects during the firing process. Rifling means that the barrel in a firearm, the barrel, is provided with spiral-shaped rifling. The opposite is a smooth-bore barrel. When the rifling engages the projectile during firing, it rotates along its longitudinal axis. Due to the rotation, minor irregularities or damage to the projectile will not cause a drift. Rotation is also necessary for an elongated (torpedo-shaped) projectile to maintain its direction after leaving the barrel and not start tumbling around. This is referred to as the projectile being rotation-stabilized. In smooth-bore weapons, only round (spherical) projectiles or fin-stabilized projectiles can be fired. An elongated projectile without fins will tumble as it leaves the muzzle.

A launching device is provided for firing, firing, projectiles with a propellant charge. The propellant charge, which can be gunpowder, for example, burns after initialization and generates a high pressure that drives the projectile out of a barrel. The projectile can be fitted to a casing filled with a propellant charge called an ammunition unit where the projectile fitted to the casing is attached or loaded to the launch device.

Alternatively, the projectile is arranged in the barrel by a method called attachment. It is common for a belt enclosing the projectile to be deformed relative to a groove arranged in the barrel which retains the projectile in the barrel. The propellant charge is arranged in what is often called a chamber in which the propellant charge is combusted during the generation of gases, gunpowder gases, which cause the projectile to move in the barrel. Preferably, a continuous/constant pressure is created in the chamber which also fills the barrel with pressurized gas behind the projectile as it moves towards the mouth of the barrel.

Preferably, projectiles with calibers in the order of 20-105 mm are arranged in the form of cased ammunition, while, in the case of larger calibers, the projectile is not cased. However, larger calibers are sometimes also cased.

For communication to and from the projectile, the projectile can be equipped with transmitters and/or receivers for radio communication. Communication may include target information, guidance information or other information relevant to the task the projectile is intended to perform. Radio communication requires an antenna to transmit and receive the electromagnetic signals.

Different forms of antennas can be arranged on the projectile, such as ceramic patch antennas, which are a variant of a microstrip antennas, which can be manufactured with a compact form factor. Since the patch antenna has a relatively narrow band, the patch antenna also has a filtering function that results in a filtering of signals outside the frequency range for which the antenna is adapted, which is important for filtering out broadband interference.

A patch antenna requires a ground plane which is a flat conductive surface connected to electrical ground. Ideally, it should be large relative to the antenna element, the patch element.

FIG. 1 shows a perspective view of a conventional patch antenna 10 with a patch element 11 having an approximately square surface, where the side is the wavelength/2. An antenna for, for example, 1575.42 MHz, which is a frequency used in GPS receivers, results in a square surface on the patch element that is 95×95 mm in size. A conductive base plate 12, which functions as a ground plane, is preferably arranged so that it is situated parallel to said patch element, for proper functionality. Printed circuit boards, shielding casings and metallic parts of the product on which the antenna is mounted can be used as conductive base plates when they act as ground planes. The space 13 between the patch element 11 and the conductive base plate 12 can be arranged with a ceramic or plastic filling with a different dielectric constant, which in the case of a ceramic can lead to a reduction in the size of the antenna to 25×25 mm and 19×19 mm respectively for the patch element with a thickness of a couple of mm in the case when the frequency is the frequency specified above for a GPS receiver. The shrunken physical size of the patch due to the ceramic filling will greatly degrade the bandwidth which is not necessarily negative unless an overly extensive information transfer rate is assumed.

The patch element 11 has a feed 16, where the antenna is manufactured with the plate 12 as ground. Preferably, the antenna is fed by a signal arranged in a coaxial cable where the center conductor is affixed to the patch element and the outer conductor to the plane 12. This type of feeding is called probe feeding. Alternatively, the antenna can be fed with a microstrip or aperture coupling. The thickness of the feed wire may be different compared to the central conductor of the coaxial cable, or may have a modified design to improve the match. The feed is placed very close to the diagonal of the near square patch element 11 at a distance from the center hole 14 which will give a suitable match (50 ohms etc.). A ceramic patch antenna can be made of metallized ceramic, where the patch element 11 is slightly smaller than the ceramic.

The patch antenna 10 according to the invention has a hole 14 in the middle of the antenna, within which hole 14 a conductive tube 15 is arranged to short-circuit the patch element 11 to the conductive base plate 12, i.e., said conductive tube is in electrical contact with the patch element and the conductive base plate. The conductive tube 15 can be created by metallizing the hole 14 if the antenna is manufactured with solid material as filling. The conductive tube 15 can also be made of a metal tube which is inserted into said hole and connected to said patch element 11 and said conductive base plate 12. In the latter case, there is no need for a solid material as filling, Another antenna principle that can be used is reflector antennas, which have conventionally been used at lower frequencies than are suitable for communication to and from a projectile. However, it is possible to develop corner reflector antennas for the GHz band. Corner reflector antennas, which are a variant of reflector antennas, are preferably fed with a dipole antenna but can also be fed with another antenna principle. A corner reflector antenna is conventionally built up of two conductive reflector panels, which can be designed as a sheet metal component with a bend or as two independent elements arranged at an angle to one another.

Figure 2:
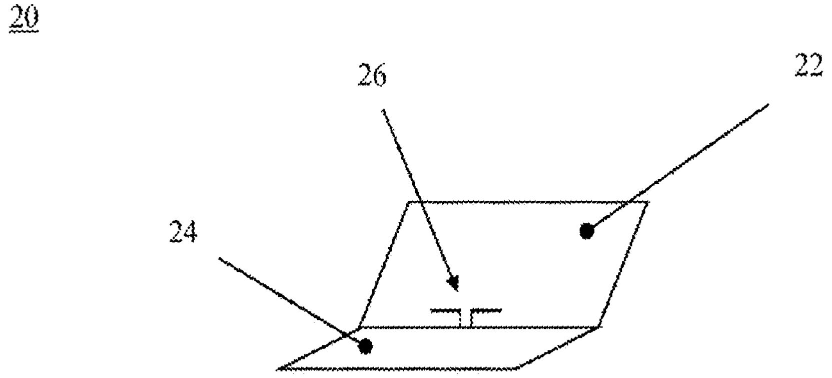
FIG. 2 shows an antenna of corner reflector antenna type.

FIG. 2 shows a corner reflector antenna 20 comprising a first reflector element 22 and a second reflector element 24 arranged at an angle for reflection of incoming/outgoing electromagnetic signals against a dipole antenna 26. The type of antenna shown in FIG. 2 can be termed a dihedral corner reflector antenna. The location and embodiment of the antenna relative to the reflector elements as well as the size and position of the reflector elements relative to each other are adapted based on the application and on the carrier on which the corner reflector antenna is to be placed. Examples of alternative design of reflector elements can also be in the form of triangular trihedral, i.e., as a three-sided pyramid, a tetrahedron, without "bottom", or square tetrahedral, i.e., a four-sided pyramid without "bottom".

Figure 3:
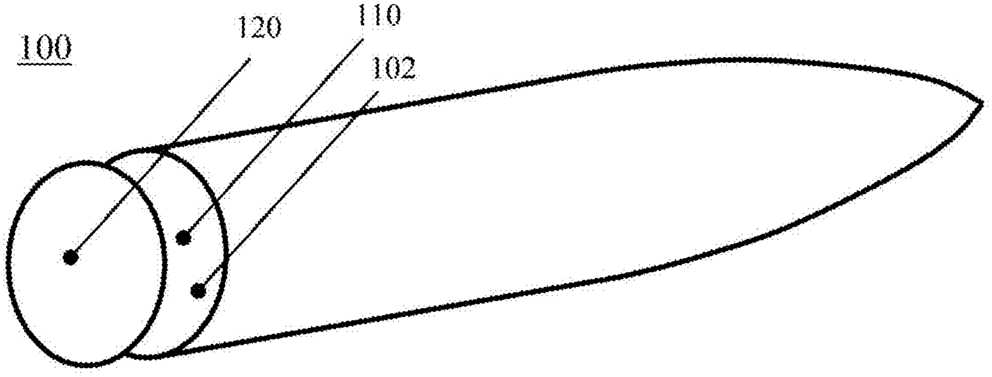
FIG. 3 shows a grenade in an oblique view from the rear with a protective cap according to an alternative embodiment of the invention.

FIG. 3 shows a projectile 100 outfitted with an antenna 110 arranged on the rear end 102 of the projectile and arranged on the surface of the rear end 102 of the projectile. The antenna 110 is protected by a protective cap 120 which is removably arranged on the projectile 100 so that the protective cap 120 protects the rear edge of the projectile, and thus also the antenna 110, when the projectile is launched. During the launch process, when gunpowder gases with high temperature and high pressure act on the projectile as the projectile travels in the barrel, the antenna 110 is protected from the gunpowder gases by a protective cap 120. In a first embodiment, the protective cap 120 has the form of a circular plate with the same diameter as the caliber of the barrel or the diameter of the projectile, the thickness of the protective cap 120 is preferably in the range of 0.1 mm to 30 mm and is made of, for example, metal, a composite or a ceramic or a polymer. The protective cap 120 can be removed by the acceleration and/or rotation of the projectile as the projectile leaves the barrel. The protective cap 120 can also be arranged so that it is imbalanced, for example by the weight of the protective cap not being arranged circularly symmetrically around the protective cap, which results in the protective cap having a different trajectory than the projectile when the projectile has left the barrel.

Figure 4:
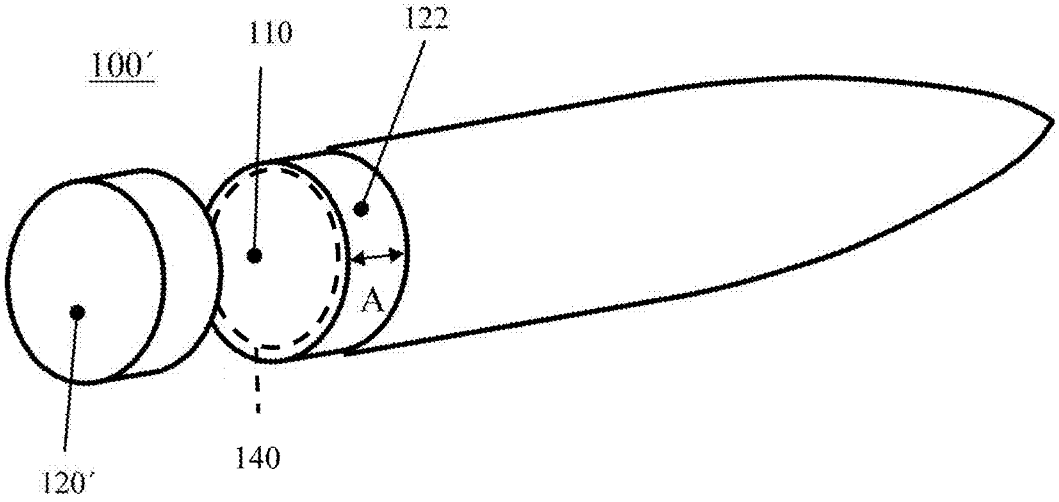
FIG. 4 shows a grenade in an oblique view from the rear with a protective cap according to an alternative embodiment of the invention.

FIG. 4 shows an alternative design of a projectile 100' outfitted with an antenna 110 arranged on the rear end of the projectile and arranged on the surface of the rear end of the projectile. The antenna 110 is protected by a protective cap 120' which is removably arranged on the projectile 100 so that the protective cap 120' protects the rear edge of the projectile, and thus also the antenna 110, when the projectile is launched. During the launch process, when gunpowder gases act on the projectile as the projectile travels in the barrel, the antenna 110 is protected from the gunpowder gases by a protective cap 120'. In a second embodiment, the protective cap 120' has the form of a cup with the same diameter as the caliber of the barrel or the diameter of the projectile. The cup encloses projectile 100' on a segment 122. The cup can enclose projectile 100' with a dimension, A, which is between 5 mm-25 mm. The cup can be made of, for example, metal, a composite or a ceramic or a polymer. The thickness of goods in the cup can be between 0.1 mm to 5 mm. The protective cap 120' can be removed by the projectile's acceleration and/or rotation when the projectile leaves the barrel The protective cap 120' can also be arranged so that it is imbalanced, for example by the weight of the protective cap not being arranged circularly symmetrically around the protective cap, which results in the protective cap having a different trajectory than the projectile when the projectile has left the barrel.

Figure 5:
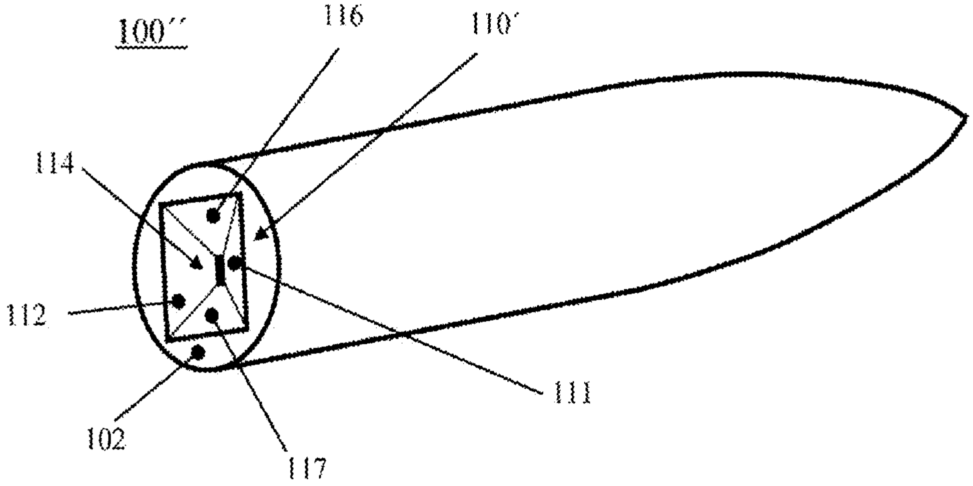
FIG. 5 shows a grenade in an oblique view from the rear with a corner reflector antenna according to an alternative embodiment of the invention.

FIG. 5 shows an embodiment of a projectile 100" arranged with an antenna structure 110' in the form of a square tetrahedral corner reflector antenna consisting of or comprising four reflector elements 111, 112, 116 and 117 and a feed element 114 in the form of a dipole antenna. The antenna structure 110' is arranged on the rear edge 102 of the projectile, which is also referred to as the bottom or the bottom plate. The rear edge 102 of the projectile is the part or surface of the projectile which is arranged at the rear of the projectile and the surface may be flat or make use of a different design based on manufacturing, aerodynamic or performance-technical needs or reasons. In one embodiment, feed element 114 mainly connects to reflector elements 111 and 112, when the physical distribution of the antenna is the same as the physical distribution of reflector elements 111 and 112, that is, reflector elements 111, 112 and feed element 114 are arranged in parallel, and when a dipole antenna is linearly polarized, the main electromagnetic radiation to and from feed element 114 also meets reflector elements 111, 112. The design of reflector elements 116, 117 can then be adapted to function as a corner reflector for a specific frequency corresponding to the frequency that a possible surveillance radar/guidance radar uses at the launch site. By arranging projectile 100" with a corner reflector, targeting and tracking of the projectile from the launch device or from the launch site is facilitated.

Figure 6:
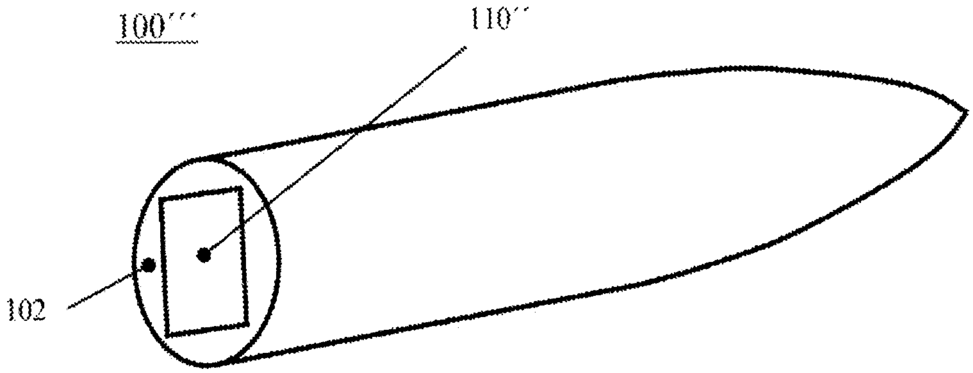
FIG. 6 shows a grenade in an oblique view from the rear with a patch antenna according to an alternative embodiment of the invention.

FIG. 6 shows an embodiment of a projectile 100'" arranged with an antenna structure 110" in the form of a patch antenna. The antenna structure 110" is arranged on the rear edge 102 of the projectile, also referred to as the bottom or the bottom plate. The rear edge 102 of the projectile is the part or surface of the projectile which is arranged at the rear of the projectile and the surface may be flat or make use of a different design based on manufacturing, aerodynamic or performance-technical needs or reasons.

Figure 7:
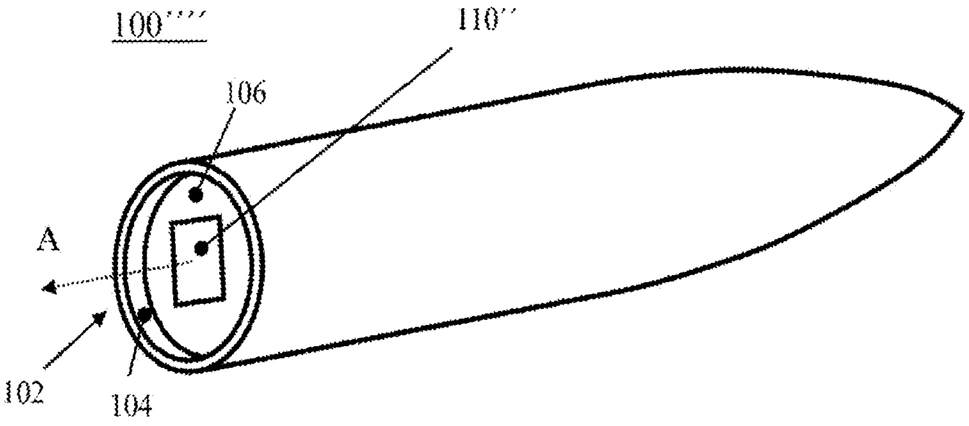
FIG. 7 shows a grenade in an oblique view from the rear with a patch antenna according to an alternative embodiment of the invention.

FIG. 7 shows an embodiment of a projectile 100" "" arranged with an antenna structure 110" in the form of a patch antenna. The antenna structure 110" is arranged on a recessed part 106 of the rear edge 102 of the projectile, also referred to as the bottom or the bottom plate. The rear edge 102 of the projectile is the part or surface of the projectile which is arranged at the rear of the projectile and the surface may be flat or make use of a different design based on manufacturing, aerodynamic or performance-technical needs or reasons. Between the rear edge of the projectile 102 and the recessed part 106 there is a shield 104 which can function as a shielding of the antenna structure 110" from electromagnetic signals coming from other directions than directly from the projectile's aft direction A. The shield 104 thus functions as an electromagnetic shield from signals, for example jamming signals, which are sent from other directions, for example from the front, and which have disruptive purpose.

Figure 8:
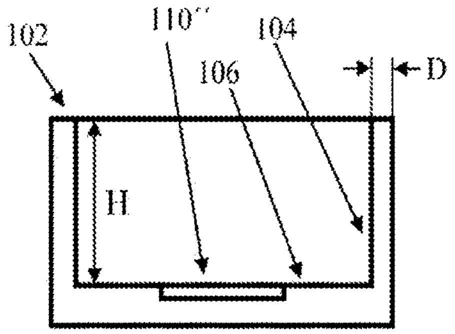
FIG. 8 shows the rear portion of a grenade in a cross-section view with a patch antenna according to an alternative embodiment of the invention.

FIG. 8 shows the rear part of a projectile where the antenna structure 110" is arranged on a recessed part 106. The distance between the recessed part 106 and the rear edge 102 of the projectile, H, is between 1 mm and 20 mm. The distance D, which is the thickness of the shield 104, is between 2 mm and 10 mm. The shield 104 is preferably made of metal and is part of the projectile 100""" and functions as shielding relative to signals coming towards the projectile from the projectile's forward direction or lateral direction, that is, directions towards which the projectile travels towards or past, where possible jamming transmitters arranged by a hostile party might be arranged. The shield 104 thus functions so that any electromagnetic radiation does not reach or is attenuated on its way to the antenna structure 110". Communication from the launch site is located directly in the direction behind the projectile, thus ensuring a clear line of sight, or close to clear line of sight from the launch site to the antenna structure 110".

Figure 9:
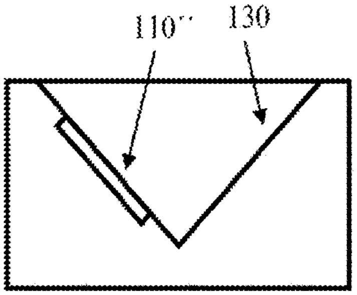
FIG. 9 shows the rear portion of a grenade in a cross-section view with a patch antenna according to an alternative embodiment of the invention.

FIG. 9 shows the rear part of a projectile where antenna structure 110" has been arranged on a radar reflector 130. The radar reflector may for instance be arranged in the form of a corner reflector to reflect incoming electromagnetic radiation from, for example, a radar that follows the projectile.

An example of caliber is 20-155 mm. With a sabot projectile, it becomes possible to fire all calibers between the largest caliber allowed by the barrel and all calibers that are smaller than said largest caliber.

The antenna is connected to the projectile's control electronics/barrel and a receiver, transmitter or transceiver is arranged in the projectile to communicate with radio signals to and/or from the projectile's control electronics/barrel. Examples of communication that can be exchanged to the projectile are control information to the projectile, position information from the projectile, method of action to the projectile, sensor information from the projectile and other information relevant to improve the current, or other subsequent or future projectiles, for purposes of being able to act on one or several target objects. Suitable adaptation in terms of the working frequency of the antennas is determined by the antenna principle and size limitations related to the arrangement of the antenna on the projectile.

The antenna can be arranged embedded in a molding compound 140 as shown in phantom in FIG. 4, alone or in combination with a protective cap 120, for example made from epoxy, resin, or silicone, where the casting compound does not affect, or has a limited effect on, the antenna's electromagnetic performance. The casting compound protects the antenna from external influences, for example from gunpowder gases, which can act on the antenna during the launch phase.

The invention is not limited to the embodiments specifically shown, but can be varied in different ways within the framework of the claims.

For instance, it is clear that the number, size, material, and shape of the elements included in the projectiles, as well as the details, are to be adapted according to the projectile(s) and projectile compositions, along with other construction-related properties, which are applicable to each individual case.

For instance, the projectile can be arranged so that it is capable of exploding, emitting shrapnel, catching fire, exerting a thermobaric effect, fighting fires, to be used as a training projectile, in light kits, in smoke kits, to exert electromagnetic effect, bring about electromagnetic disturbances or other loads and functions.

The invention claimed is:

1. A projectile arranged with an antenna, where the projectile has a diameter equal to a caliber of a barrel of a launch device, the launch device including a separate propellant charge disposed in the barrel, wherein the projectile is arranged with the antenna in a rear edge of the projectile where the antenna is arranged behind any of or a combination of:

i. a protective cap with a diameter equal to the caliber of the barrel which protects the antenna during an ejection phase in the barrel and which is removed when the projectile has left the barrel, ii. a protection in the form of a molding compound arranged in a recess of the projectile to protect the antenna from the propellant charge during launch, said molding compound remains with the projectile after launch and does not interfere with antenna performance, with the antenna being one of:

i.) a patch antenna, and ii.) a corner reflector antenna, and wherein the antenna is arranged behind the protective cap and the protective cap is a cup which partially encloses the projectile, said projectile including a rear cap region with a smaller diameter than the caliber of the barrel so that a thickness of the cap stays within the inner diameter of the barrel.

2. The projectile arranged with the antenna according to claim 1, wherein the antenna is the corner reflector antenna and is arranged with a dipole, said corner reflector antenna inset in to the projectile.

3. The projectile arranged with the antenna according to claim 1, wherein the antenna is the patch antenna type and where the patch antenna is arranged on a surface of a radar reflector.

4. The projectile arranged with the antenna according to claim 1, wherein the antenna is the patch antenna type and is arranged on a recessed part, where a distance how far the recessed part is recessed relative to the rear edge is between 1 mm to 20 mm.

5. The projectile arranged with the antenna according to claim 4, comprising a shield for the antenna, wherein a thickness of the shield is between 2 mm to 10 mm.

6. The projectile arranged with the antenna according to claim 1, wherein the antenna is arranged behind the protective cap and the protective cap is a circular plate with a same diameter as the projectile and with a thickness in a range of 0.1 mm-30 mm.

7. The projectile arranged with the antenna according to claim 1, wherein the projectile is arranged with a part where the cup is arranged to the projectile, with a spread in an axial joint of the projectile in a range 5 mm to 25 mm.

8. The projectile arranged with the antenna according to claim 1, wherein the antenna is the corner reflector and is arranged in the rear edge of the projectile.

* * * * *